No. 778,318.

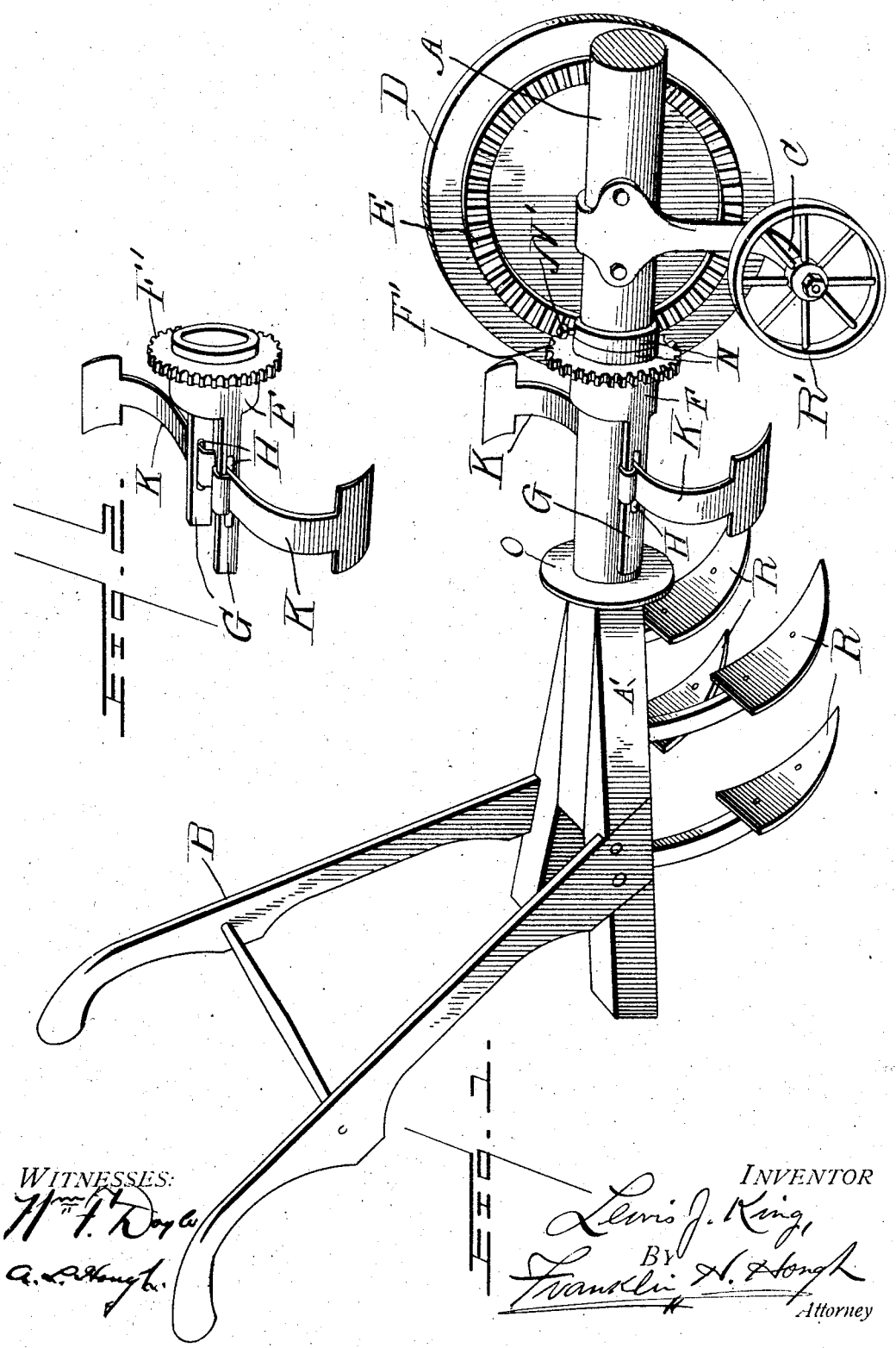

Patented December 27, 1904.

UNITED STATES PATENT OFFICE.

LEWIS JONES KING, OF FAIRPLAY, SOUTH CAROLINA.

COMBINED CULTIVATOR AND COTTON-CHOPPER.

SPECIFICATION forming part of Letters Patent No. 778,318, dated December 27, 1904.

Application filed April 21, 1904. Serial No. 204,229.

*To all whom it may concern:*

Be it known that I, LEWIS JONES KING, a citizen of the United States, residing at Fairplay, in the county of Oconee and State of South Carolina, have invented certain new and useful Improvements in a Combined Cultivator and Cotton-Chopper; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in combined cultivators and cotton-choppers; and the object of the invention is to produce an apparatus of this nature which will effectually chop out the weeds and loosen the dirt about the cotton-plant and fill in the loose soil about the plant afterward.

More specifically, the invention comprises a plow-beam carrying a yoke on which wheels of any suitable diameter are journaled, one of which is provided with a series of cog-teeth on one face thereof, which are adapted to mesh with elongated teeth about the circumference of a cylindrical hoe-carrying member which is journaled upon the plow-beam.

The invention consists, further, in various details of construction and combinations and arrangements of parts, which will be hereinafter fully described and then specifically defined in the appended claim.

My invention is illustrated in the accompanying drawings, in which—

Figure 1 is a perspective view of my improved combined cultivator and cotton-chopper; and Fig. 2 is an enlarged detail view of the rotary cylindrical member carrying the hoes, showing the manner of adjusting the latter.

Reference now being had to the details of the drawings by letter, A designates a plow-beam which is preferably cylindrical in shape and has at its rear end suitable handles B. Mounted on said beam is a yoke C, one end of which is bent to form a stub-shaft, on which a wheel D is journaled, and on the other end of said yoke is mounted a wheel E'. Upon the face of said wheel D is a circular series of cog-teeth E, which are provided for the purpose of rotating the cylindrical hoe-carrying member F. Said member F has a longitudinal bore and is journaled upon the beam, as illustrated, and has adjacent to one end and about its circumference a series of cog-teeth F', which are provided for engagement with the cog-teeth upon the face of the wheel D. Said member has two projecting arms G G diametrically opposite each other, and each is provided with an elongated slot H.

K K designate hoe-carrying arms, the inner ends of which are held in said elongated slots H, and said arms may be fixed at any locations within the slots to bring one of the hoes in advance of the other or directly opposite the other, as may be desired. Said arms in the drawings are shown as curved and carrying hoes at the ends, and, if desired, rakes may be substituted for the hoes. Collars N are mounted upon the cylindrical portion of the plow-beam, being held thereon by set-screws N', and limit the adjustment of said hoe-carrying member F in one direction, and a disk O, bearing against the inclined beams A', limits the rearward movement of said arms G.

Upon the under side of the beam, adjacent to its rear end, are mounted cultivator-plows R R, which may be of any suitable shape.

A second wheel R' is mounted on the axle or shaft C, of smaller diameter than wheel D, and the two wheels are adapted to straddle a row of plants.

The operation of my improved apparatus is as follows: The rotary movement of the wheel will cause the cylindrical-shaped member which is journaled upon the plow-beam to rotate and to chop and work the soil about the tender plants, while the plows which follow the scraper will turn the soil about the roots of the plant, which will keep the young plant erect and mellow the dirt about the young roots, thereby assisting the development of the same.

While I have shown a particular construction of apparatus illustrating the construction of my invention, it will be understood that I may make alterations in the apparatus, if desired, without departing from the spirit of the invention.

Having thus fully described my invention, what I claim as new, and desire to secure by Letters Patent, is—

A combined cultivator and cotton-chopper comprising a cylindrical beam, a yoke having its upper end bent to form a hook adapted to engage over said beam, said yoke having wings fastened to the beam, and a contracted vertically-disposed shank portion, the lower end of which is outwardly curved, a wheel journaled on said outwardly-curved end, a pinion-wheel and shell to which the same is fixed, a driving-wheel with circular series of teeth thereon in mesh with said pinion, said shell having diametrically opposite arms projecting therefrom, said arms being longitudinally slotted, scraper-arms turned into rolls at their inner ends and passing through said slots in the arms, as shown and described.

In testimony whereof I hereunto affix my signature in presence of two witnesses.

LEWIS JONES KING.

Witnesses:
L. L. JARRARD,
P. D. JARRARD.